(12) United States Patent
Loijas et al.

(10) Patent No.: US 10,300,489 B2
(45) Date of Patent: May 28, 2019

(54) BLADE ELEMENT FOR REFINER

(71) Applicants: Marko Loijas, Valkeakoski (FI); Timo Könönen, Nokia (FI); Matti Kaarineva, Lempäälä (FI)

(72) Inventors: Marko Loijas, Valkeakoski (FI); Timo Könönen, Nokia (FI); Matti Kaarineva, Lempäälä (FI)

(73) Assignee: Valmet Technologies, Inc., Espoo (FI)

( * ) Notice: Subject to any disclaimer, the term of this patent is extended or adjusted under 35 U.S.C. 154(b) by 930 days.

(21) Appl. No.: 14/754,510

(22) Filed: Jun. 29, 2015

(65) Prior Publication Data
US 2015/0375232 A1 Dec. 31, 2015

(30) Foreign Application Priority Data
Jun. 30, 2014 (FI) ...................................... 20145629

(51) Int. Cl.
| | |
|---|---|
| B02C 7/12 | (2006.01) |
| B02C 7/04 | (2006.01) |
| B02C 7/02 | (2006.01) |
| B02C 7/06 | (2006.01) |
| D21D 1/30 | (2006.01) |
| B23P 15/40 | (2006.01) |

(52) U.S. Cl.
CPC ............... *B02C 7/12* (2013.01); *B02C 7/02* (2013.01); *B02C 7/04* (2013.01); *B02C 7/06* (2013.01); *B23P 15/40* (2013.01); *D21D 1/30* (2013.01); *D21D 1/303* (2013.01); *D21D 1/306* (2013.01)

(58) Field of Classification Search
CPC .... B02C 7/02; B02C 7/12; B02C 7/06; B02C 7/04; D21D 1/30; D21D 1/303; D21D 1/306; B23P 15/40

USPC .............................................. 241/261.2, 261.3
See application file for complete search history.

(56) References Cited

U.S. PATENT DOCUMENTS

| | | | |
|---|---|---|---|
| 4,635,864 A | 1/1987 | Peterson et al. | |
| 5,687,917 A * | 11/1997 | Law .................. | D21D 1/008 241/21 |

(Continued)

FOREIGN PATENT DOCUMENTS

| | | |
|---|---|---|
| CA | 1185471 A1 | 4/1985 |
| EP | 2559807 A1 | 2/2013 |

(Continued)

OTHER PUBLICATIONS

Finnish Patent and Registration Office Search Report for Patent Application No. 20145629 dated Dec. 17, 2014.

*Primary Examiner* — Shelley M Self
*Assistant Examiner* — Christopher B Wehrly
(74) *Attorney, Agent, or Firm* — Stiennon & Stiennon

(57) ABSTRACT

A blade element (11) for a refiner (10) for refining fibrous material has a blade element body (12) and blade bars (13, 13a, 13b) and blade grooves (14, 14a, 14b) therebetween. Bottoms of the blade grooves (14, 14a, 14b) have, in the longitudinal direction (LD) of the blade grooves, a variable depth profile comprising alternating high points (14a', 14b') and low points (14a", 14b") so that there is a phase shift (X2) between the high points (14a', 14b') and the low points (14a", 14b") of the variable depth profiles of the bottoms of the adjacent blade grooves (14a, 14b). Also, a refiner (10) for refining fibrous material and a method for manufacturing the blade element (11) for the refiner (1).

9 Claims, 4 Drawing Sheets

(56) References Cited

U.S. PATENT DOCUMENTS 6,616,078 B1 * 9/2003 Gingras .................. B02C 7/12
                                                                     241/261.2
9,050,602 B2 * 6/2015 Ruola .................... D21D 1/306

FOREIGN PATENT DOCUMENTS

| EP | 2669427 A2 | 12/2013 |
|----|------------|---------|
| FI | 110521 B | 2/2003 |
| WO | 2010112667 A1 | 10/2010 |
| WO | 2012101330 A1 | 8/2012 |

* cited by examiner

A-A

BLADE ELEMENT FOR REFINER

CROSS REFERENCES TO RELATED APPLICATIONS

This application claims priority on Finnish application FI 20145629, filed Jun. 30, 2014, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a blade element for a refiner for refining fibrous material, the blade element comprising a blade element body and blade bars and blade grooves therebetween, the blade bars and the blade grooves providing a refining surface of the blade element, and in which blade element bottoms of the blade grooves have, in the longitudinal direction of the blade grooves, a variable profile comprising alternating high points and low points.

The present invention also relates to a refiner for refining fibrous material, the refiner comprising opposing refining elements, each of which comprises at least one blade element provided with blade bars and blade grooves therebetween.

The present invention also relates to a method for manufacturing a blade element for a refiner for refining fibrous material, the method comprising manufacturing a blade element billet comprising a blade element body and protrusions and recesses therebetween for providing blade bar billets and blade groove billets therebetween.

Refiners intended for refining fibrous, lignocellulose-containing material are employed, for instance, for producing pulp to be used in paper or board manufacturing. Conventionally, these refiners comprise two opposing refining elements, at least one of which is arranged to rotate relative to the other so that the refining surfaces may move in relation to one another. One refiner, however, may also comprise several pairs of opposing refining elements. There is a blade gap between the opposing refining elements, into which blade gap material to be refined is fed. The refining elements comprise one annular blade element or several sector-like blade elements providing together an annular refining element. The blade elements comprise blade bars and blade grooves therebetween, the blade bars and the blade grooves providing a refining surface of the blade element, whereby the refining surface of a single blade element alone or the refining surfaces of several blade elements provide a refining surface of the refining element. The blade elements are typically manufactured by casting a blade element billet, which comprises a blade element body and blade bar billets and blade groove billets therebetween, which blade bar billets and blade groove billets may thereafter be machined for finalizing the blade bar and blade groove geometry.

US publication 6616078 B1 discloses a blade element for a refiner for refining fibrous material. The blade element has blade bars and blade grooves therebetween. Bottoms of the blade grooves have, in the longitudinal direction of the blade grooves, a variable profile comprising alternating high points and low points. The variable profile of the bottom of the blade groove, comprising alternating high points and low points, forces the material to be refined to flow into the blade gap between the opposing refining elements. The purpose is to ensure that all the material fed into the refiner enters into the blade gap in order to be refined, whereby any portion of the material fed into the refiner would not just flow through the refiner without entering into the blade gap to be processed.

SUMMARY OF THE INVENTION

An object of the present invention is to provide a novel type of a blade element for a refiner for refining fibrous material.

The blade element according to the invention is characterized in that there is a phase shift between the high points and the low points of the variable profile bottoms of the adjacent blade grooves.

The blade element is a blade segment providing a part of the complete refining surface of a refining element in the refiner.

The method according to the invention is characterized by machining the blade groove billets to form blade grooves, wherein the bottoms of the blade grooves have, in the longitudinal direction of the blade grooves, a variable profile comprising alternating high points and low points in such a way that there is a phase shift between the high points and the low points of the variable profile bottoms of the adjacent blade grooves.

When there is a phase shift between the high points and the low points of the variable profile bottoms of the adjacent blade grooves, the profile of the bottom of at least one blade groove provides a support for a blade bar at least on one side of the blade bar at all portions of the blade bar in the longitudinal direction of the blade bar. Due to this support effect, a durable blade bar configuration is provided against impacts caused by for example foreign objects that have entered into the blade gap of the refiner and hit the blade bar so that the blade bar does not break so easily compared to conventional blade bar and blade groove geometries. Because of an increased durability of blade bars, the height of the blade bar may also be increased, which increases the effective service life of the blade element.

According to an embodiment of the blade element, the magnitude of the phase shift is between 120 and 240 degrees, preferably between 150 and 210 degrees, and most preferably 180 degrees.

According to an embodiment of the blade element, at least at one low point in at least one blade groove, the profile of the bottom of the blade groove is arranged to extend through the blade element body, whereby the blade element comprises at least one opening extending through the blade element body in at least one blade groove.

According to an embodiment of the blade element, the profile of the bottom of the blade groove has a continuous periodic waveform.

According to an embodiment of the blade element, the wavelength of the continuous periodic waveform is arranged to vary in the longitudinal direction of the blade groove.

According to an embodiment of the blade element, the blade bar angle is arranged to vary continuously in the longitudinal direction of the blade bar.

According to an embodiment of the blade element, in adjacent blade bars the absolute magnitudes of the blade bar angles are equal but the directions of the phase angles of the blade bar angles are opposite at the same positions in the adjacent blade bars.

According to an embodiment of the blade element, the change in the phase of the blade groove (14, 14a, 14b) bottom profile and a change in the phase angle of the blade bar angle ($\alpha 13a$, $\alpha 13b$) are mutually synchronized.

According to an embodiment of the blade element, the blade element is a blade segment intended to provide a part of the complete refining surface of a refining element of the refiner.

According to an embodiment of the method, the blade bar billets are machined to form blade bars, wherein the blade bar angle of the blade bar is arranged to vary in the longitudinal direction of the blade bar in such a way that in adjacent blade bars the absolute magnitudes of the blade bar angles are equal but the directions of the phase angles are opposite at the same positions of the adjacent blade bars.

According to an embodiment of the method, the blade element billet comprising a blade element body and protrusions and recesses therebetween for providing blade bar billets and blade groove billets there-between is manufactured by casting.

According to an embodiment of the method, the blade bar billets and the blade groove billet are machined with three-axis machining for providing the blade bars and the blade grooves.

BRIEF DESCRIPTION OF THE DRAWINGS

In the following the invention will be described in greater detail by means of preferred embodiments with reference to the accompanying drawings.

FIG. 2b is a schematic enlarged view of a portion of FIG. 2a.

For the sake of clarity, the figures show some embodiments of the invention in a simplified manner. Like reference numerals identify like elements in the figures.

DESCRIPTION OF THE PREFERRED EMBODIMENTS

Figure 1:
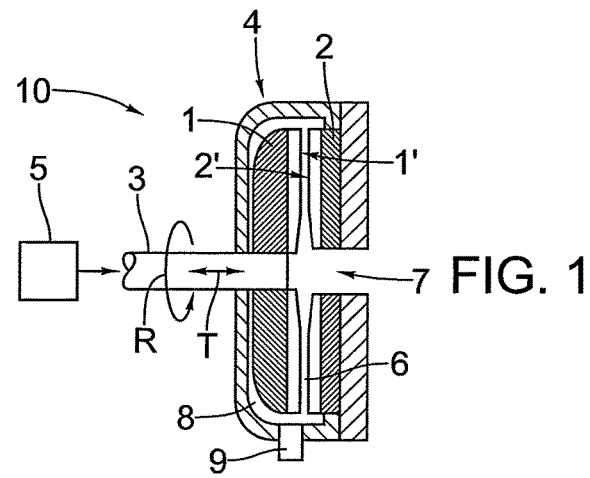
FIG. 1 is a schematic side view of a general structure of a refiner in cross-section.

FIG. 1 schematically shows a cross-sectional side view of a disc refiner 10. The disc refiner 10 of FIG. 1 comprises a disc-like first refining element 1 and a disc-like second refining element 2. The first refining element 1 comprises a first refining surface 1' and the second refining element 2 comprises a second refining surface 2'. The first refining element 1 and the second refining element 2 are arranged coaxially to one another such that the first refining surface 1' and the second refining surface 2' are substantially opposite to one another. In the disc refiner 10 of FIG. 1 the first refining element 1 is arranged rotatable by a shaft 3, for instance, in the direction of arrow R shown schematically in FIG. 1, the first refining element 1 thus constituting a rotor 1 of the disc refiner 10. For the sake of clarity, FIG. 1 does not show the motor used for rotating the first refining element 1, which motor may be implemented in manners obvious to a person skilled in the art. Further, in the disc refiner 10 of FIG. 1 the second refining element 2 is fixedly supported to a frame structure 4 of the disc refiner 10, the second refining element 2 thus constituting a stator 2 of the refiner 10. Thus, as the first refining element 1 rotates, when the refiner 10 is in operation, the first refining element 1 and the second refining element 2 are arranged to move in relation to one another. FIG. 1 further shows a loading device 5, which is coupled to act through a shaft 3 on the first refining element 1 such that the first refining element 1 may be transferred towards the second refining element 2 or away therefrom, as schematically indicated by arrow T, so as to adjust a blade gap 6 between the first refining element 1 and the second refining element 2.

In the disc refiner 10 of FIG. 1, fibrous, lignocellulose-containing material to be refined may be fed through a feed opening 7 in the middle of the second refining element 2 into the blade gap 6 between the opposing refining elements 1 and 2, where it is defibrated and refined while the water contained in the material vaporizes. The material to be refined may also be fed into the blade gap 6 through openings arranged in the first refining surface 1' and/or the second refining surface 2', which openings are not shown in FIG. 1 for the sake of clarity. Refined material exits the blade gap 6 from its outer edge to a refining chamber 8 of the refiner 10 and further out of the refining chamber 8 through a discharge channel 9.

FIG. 1 shows schematically the disc refiner 10. However, a refiner may also be implemented as a conical refiner comprising conical refining elements, or as a cylindrical refiner comprising cylindrical refining elements.

Figure 2B:
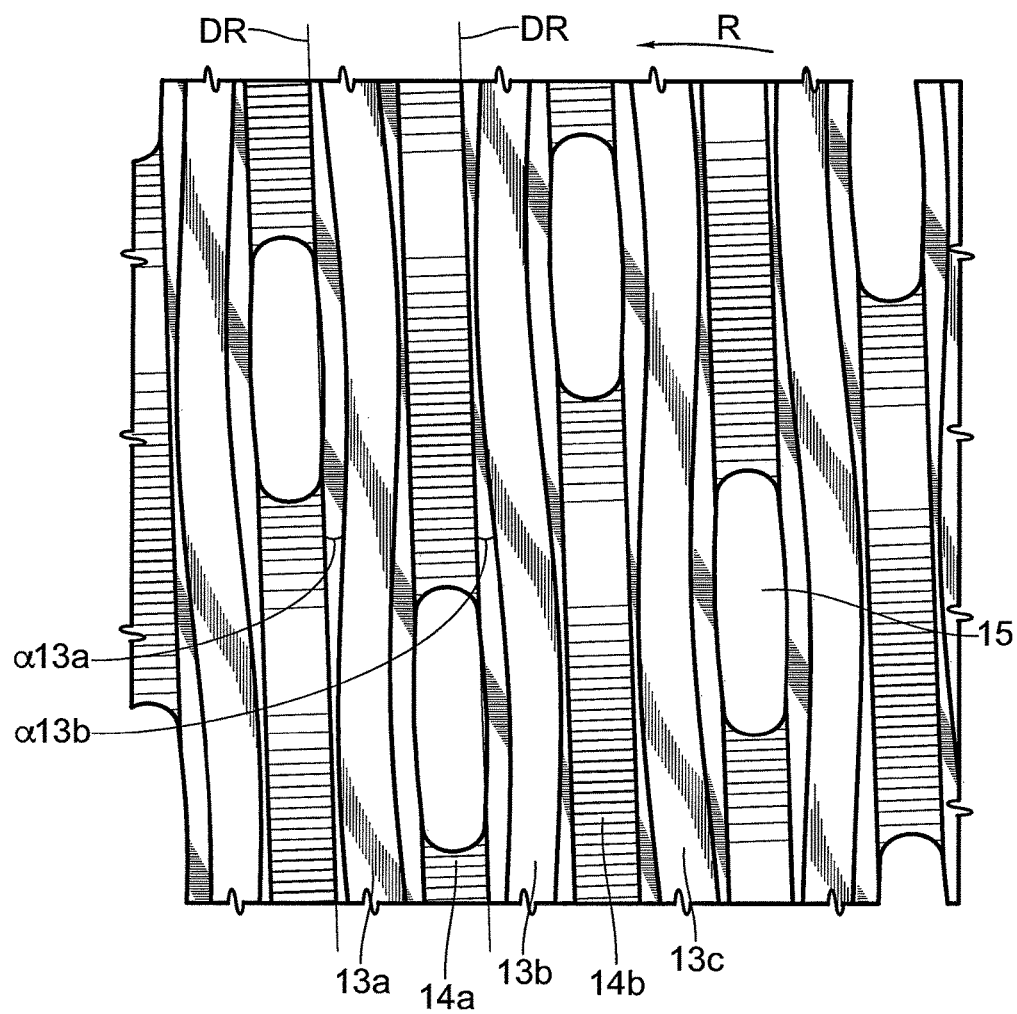
Figure 2A:
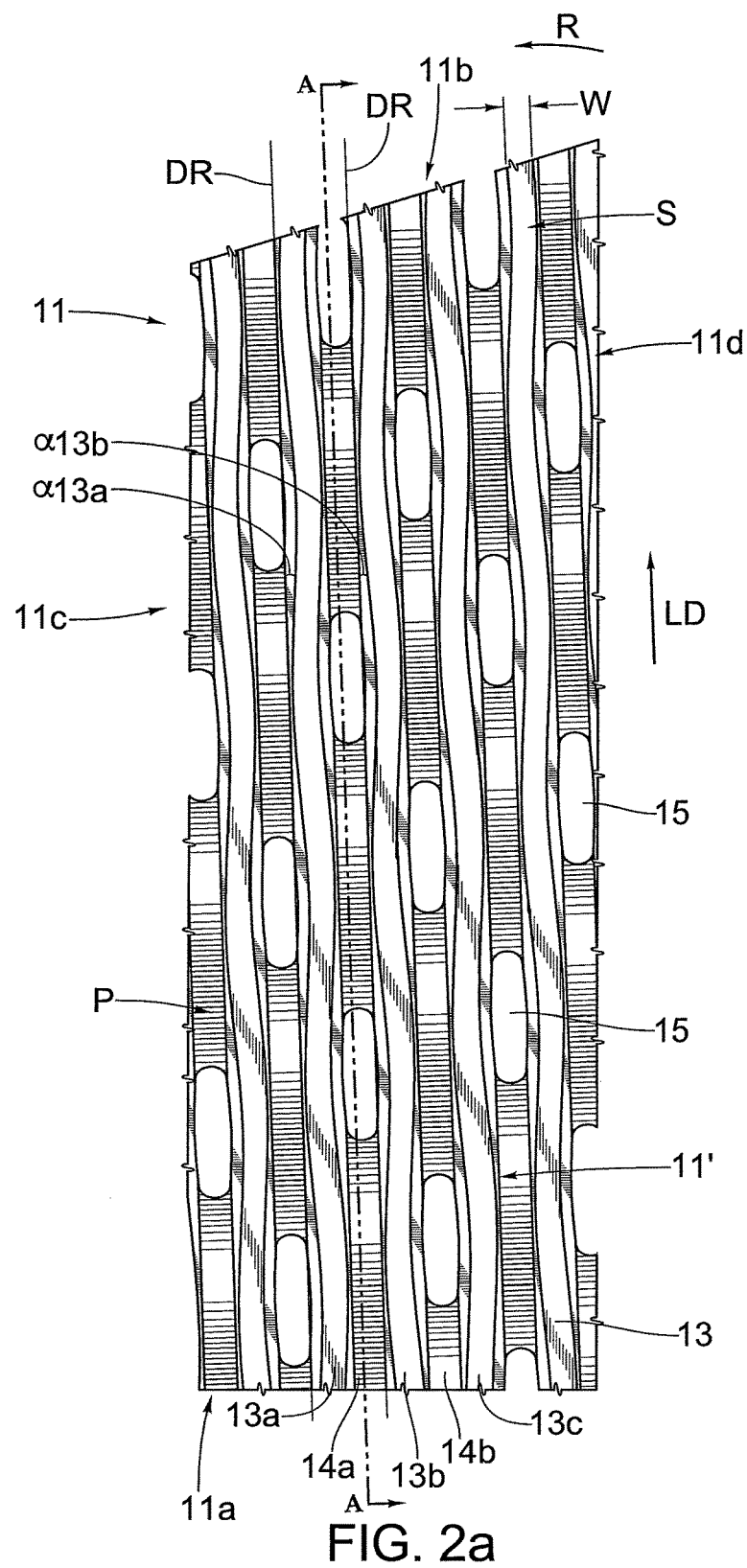
FIG. 2a is a schematic view of a blade element seen in the direction of a refining surface of the blade element.
Figure 3:
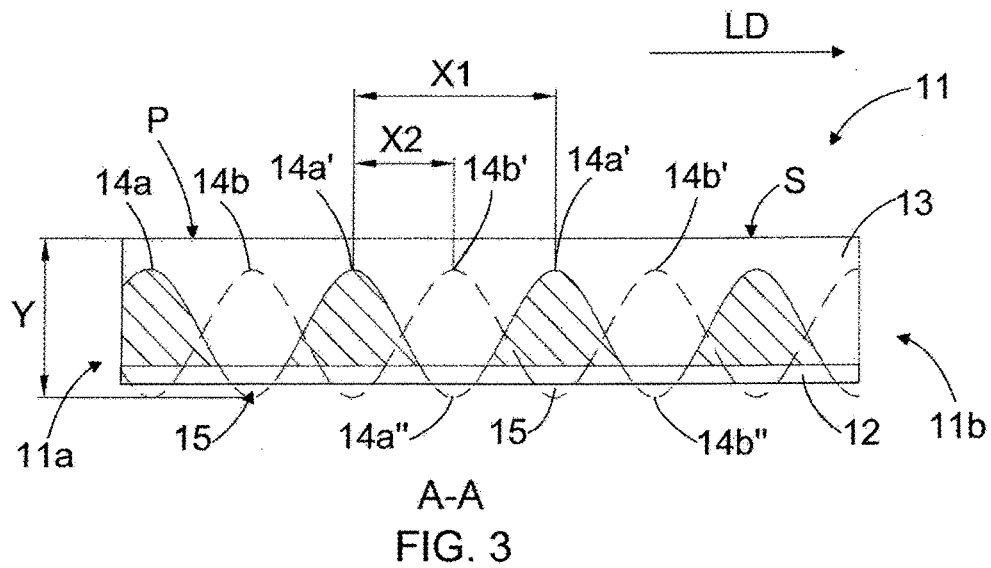
FIG. 3 is a schematic cross-section of the blade element of FIG. 2.

FIG. 2a shows schematically a blade element 11 seen in the direction of a refining surface 11' of the blade element 11. FIG. 2b is a schematic enlarged view of a portion of FIG. 2a. FIG. 3 shows schematically a cross-section of the blade element 11 of FIG. 2a along line A-A in FIG. 2a. The blade element 11 of FIG. 2a is a blade segment intended to provide only a part of the refining surface 1', 2' of the first refining element 1 or the second refining element 2 of the disc refiner 10 according to FIG. 1, whereby a complete refining surface 1', 2' of the first refining element 1 or the second refining element 2 may be provided by arranging a number of blade segments of FIG. 2a next to each other. In the context of the solution presented, the complete refining surface 1', 2' of the first refining element 1 and/or the second refining element 2 could also be provided with a single annular blade element extending over the whole periphery of the first refining element 1 and/or the second refining element 2. A complete refining surface of a conical refining element or a cylindrical refining element could also be provided by a number of applicable blade segments or with a single conical or cylindrical blade element correspondingly.

The blade element 11 comprises a blade element body 12 or a blade element base 12 and blade bars and blade grooves therebetween. In FIG. 2a, the blade bars are denoted generally with reference sign 13 and the blade grooves are denoted generally with reference sign 14. The blade element 11 has an inner circumference 11a, i.e., an inner edge 11a, to be directed towards the center of the disc refiner 10 and an outer circumference 11b, i.e., an outer edge 11b, to be directed towards the outer periphery of the disc refiner 10. The inner circumference 11a of the blade element 11 may also be called a feed edge 11a, through which the material to be refined is fed onto the refining surface 11' when the blade element 11 is attached to the refining element 1 or 2, and the outer circumference 11b of the blade element 11 may also be called a discharge edge 11b, through which the material already refined is discharged away from the refining surface 11' when the blade element 11 is attached to the refining element 1 or 2. Further, the blade element 11 has a first side edge 11c and a second side edge 11d, which are arranged against the first side edge 11c and the second side edge 11d of another blade element 11 when a number of blade elements 11 are attached to the refining elements 1, 2 for providing the refining surface 1', 2' of the refining elements 1, 2.

In the solution, differences between adjacent blade grooves and adjacent blade bars are of interest at a time. Therefore, for more detailed consideration, in FIGS. 2a and 2b two adjacent blade grooves are denoted with reference signs 14a and 14b and three adjacent blade bars are denoted with reference signs 13a, 13b and 13c. In the following description, the blade groove 14a may also be called the first blade groove 14a and the blade groove 14b may also be called the second blade groove 14b. Similarly, the blade bar 13a may also be called the first blade bar 13a and the blade bar 13b may also be called the second blade bar 13b and the blade bar 13c may also be called the third blade bar 13c. In FIG. 3 the unbroken line is intended to denote the bottom or the bottom surface of the blade groove 14a, the unbroken line 14a thus presenting a profile of the bottom or the bottom surface of the blade groove 14a positioned in front of the blade bar 13 in the viewing direction of FIG. 3. Further in FIG. 3, the broken line is intended to denote the bottom or the bottom surface of the blade groove 14b, the broken line 14b thus presenting a profile of the bottom or the bottom surface of the blade groove 14b positioned behind the blade bar 13 in the viewing direction of FIG. 3. The blade grooves 14a and 14b thus constitute adjacent or neighboring blade grooves 14a, 14b in the blade element 11.

As can be seen in FIGS. 2a and 3, the bottoms of the blade grooves 14, 14a and 14b have a variable profile comprising alternating high points and low points in the longitudinal direction of the blade grooves 14, 14a and 14b, the longitudinal direction of the blade grooves being denoted with arrow LD in FIGS. 2a and 3 and later in FIGS. 4, 5, 6 and 7, too. In the embodiments disclosed in FIGS. 2a to 7, the longitudinal direction of the blade grooves 14, 14a and 14b thus corresponds to the direction from the inner circumference 11a of the blade element 11 towards the outer circumference 11b of the blade element 11. High points of the bottoms of the blade grooves 14a, 14b are denoted with reference signs 14a', 14b' and low points of the bottoms of the blade grooves 14a, 14b are denoted with reference signs 14a", 14b".

Figure 4:
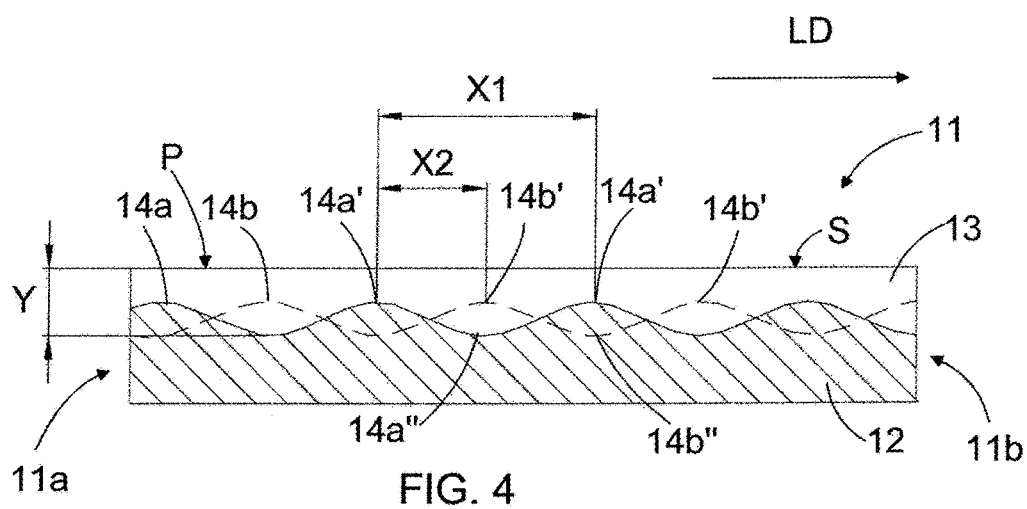
FIG. 4 is a schematic cross-section of a second blade element.
Figure 5:
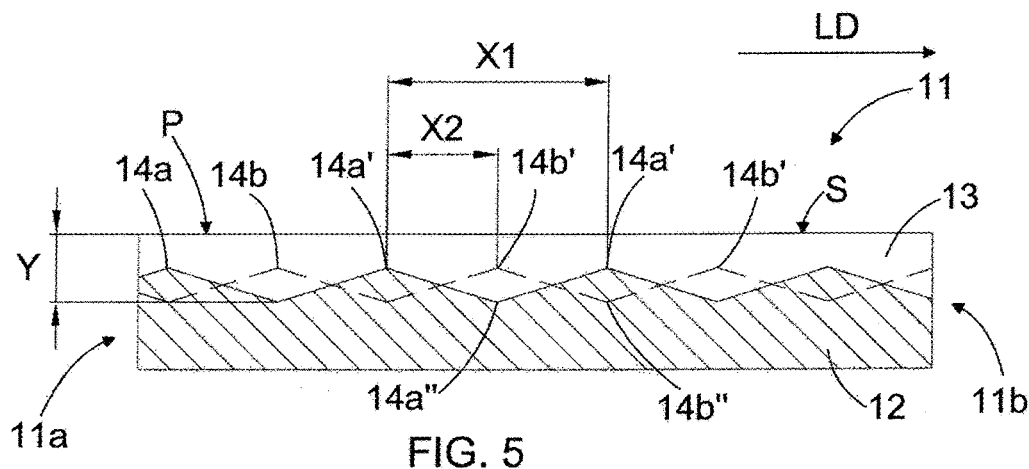
FIG. 5 is a schematic cross-section of a third blade element.
Figure 6:
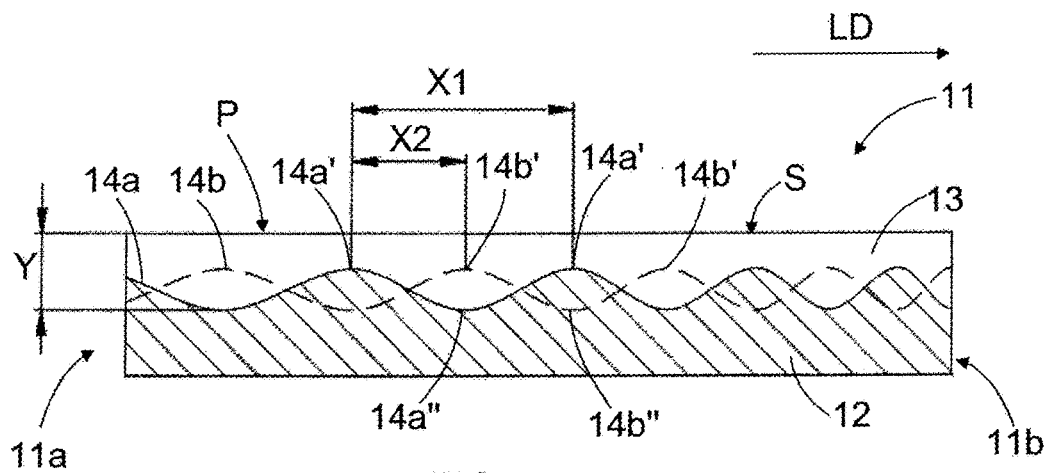
FIG. 6 is a schematic cross-section of a fourth blade element.
Figure 7:
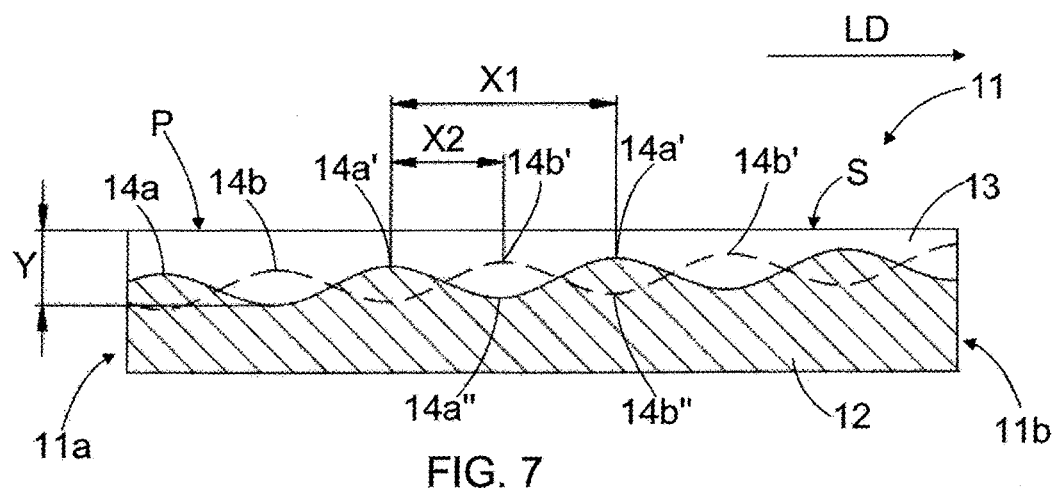
FIG. 7 is a schematic cross-section of a fifth blade element.

FIG. 4 shows schematically a cross-section of a second blade element, and FIG. 5 shows schematically a cross-section of a third blade element. FIG. 6 shows schematically a cross-section of a fourth blade element, and FIG. 7 shows schematically a cross-section of a fifth blade element. As in FIG. 3, in FIGS. 4, 5, 6 and 7 the unbroken line is intended to denote the bottom or the bottom surface of the blade groove 14a and the broken line is intended to denote the bottom or the bottom surface of the blade groove 14b. In FIGS. 4, 5, 6 and 7, too, the bottoms of the blade grooves 14a and 14b have a variable profile comprising alternating high points 14a', 14b' and low points 14a", 14b" in the longitudinal direction LID of the blade grooves 14a and 14b.

In the embodiments of FIGS. 3 and 4, the profiles of the bottoms of the blade grooves 14a, 14b have uniformly continuous periodic waveform, the profiles of the bottoms of the blade grooves 14a, 14b in the embodiment of FIG. 3 resembling a sine wave and the profiles of the bottoms of the blade grooves 14a, 14b in the embodiment of FIG. 4 resembling another uniformly continuous periodic waveform. In the embodiment of FIG. 5, the profiles of the bottoms of the blade grooves 14a, 14b have a non-uniformly continuous periodic waveform having a form of a triangular wave. The variable profile of the bottom of the blade grooves 14a, 14b, comprising alternating high points 14a', 14b', i.e. wave crests 14a', 14b', and low points 14a", 14b", i.e. wave troughs 14a", 14b", forces the flow of material to be refined into the blade gap 6 between the opposing refining elements 1, 2 at the location of the high points 14a', 14b'. This increases the degree of refining, because any portion of the material fed into the refiner should not just flow through the refiner without entering into the blade gap 6 to be processed.

In the embodiments of FIGS. 3, 4, 5, 6 and 7, the reference sign X1 denotes the distance between two successive high points 14a', i.e. wave crests, in the longitudinal direction LID of the blade groove 14a. The distance X1 may thus be considered to correspond to the length of one complete portion, i.e. one wave, in the variable profile bottom of the blade groove. The distance X1 is thus a parameter determining the wavelength of the waveform in the variable profile bottom of the blade groove. In each embodiment of FIGS. 3, 4 and 5, the distance between two successive high points 14b' in the variable profile bottom of the second blade groove 14b is determined to be the same X1 as the distance between two successive high points 14a' in the variable profile bottom of the first blade groove 14a of that same embodiment.

The reference sign X2 in FIGS. 3, 4, 5, 6 and 7, in turn, determines the distance between the high points 14a', 14b', or wave crests 14a', 14b', in the adjacent blade grooves 14a, 14b, when considering the longitudinal direction LID of the adjacent blade grooves 14a, 14b. The distance X2 is thus a parameter which determines the phase shift between the variable profile bottoms of the adjacent blade grooves 14a, 14b.

In all embodiments shown in FIGS. 3, 4 and 5, the distance X2 between the high points 14a', 14b' in the adjacent blade grooves 14a, 14b is half of the wavelength of the variable profile bottoms of the blade grooves 14a, 14b, corresponding to a phase shift of 180 degrees. This means that in the longitudinal direction LD of the blade grooves 14a, 14b, the low point 14b", i.e. wave trough 14b", in the bottom surface of the second blade groove 14b is exactly at the same point as the high point 14a' in the bottom surface of the first blade groove 14a, or in other words, the bottom surfaces of the adjacent blade grooves 14a, 14b are at opposite phases at the same location or position in the adjacent blade grooves 14a, 14b in the longitudinal direction LD of the blade grooves 14a, 14b.

In the blade bar and blade groove configurations disclosed in FIGS. 3, 4 and 5, as well as later in FIGS. 6 and 7, too, the profile of the bottom of at least one blade groove 14a, 14b provides a support for the blade bar 13 at least on one side of the blade bar 13 at all portions of the blade bar 13 in the longitudinal direction LD of the blade bar 13. Referring to FIG. 3, for example, this means that when there is a low point 14a" at the bottom of the first blade groove 14a on one side of the blade bar 13a at a specific location or position of the blade bar 13 in the longitudinal direction LD of the blade bar 13, there is, at the same specific location or position of the blade bar 13 in the longitudinal direction LD of the blade bar 13 but on the opposite side of the blade bar 13, a high point 14b' at the bottom surface of the second blade groove 14b, and vice versa. In that case, a portion of the profile of the bottom of the second blade groove 14b extending upwards and terminating at the high point 14b'provides a support for the blade bar 13 at that same portion of the blade bar 13 in the longitudinal direction LD of the blade bar 13 where there is a portion of the profile of the bottom of the first blade groove 14b extending downwards and terminating at the low point 14a". It may thus be said that the high points 14a', 14b' and the low points 14a", 14b" alternate in the adjacent blade grooves 14a, 14b in the longitudinal direction LD of the blade grooves 14a, 14b. This provides a support effect for the blade bar 13, due to which a durable blade bar configuration is provided against impacts caused by for example foreign objects that have entered into the blade gap of the refiner and hit the blade bar so that the blade bar does not break so easily compared to conventional blade bars and blade groove geometries. Because of an increased durability of blade bars, the height of the blade bar may also be increased, which increases the effective service life of the blade element.

In the embodiments shown above, the phase shift between the high points 14a', 14b' of the bottoms of the adjacent blade grooves 14a, 14b is exactly 180 degrees. However, in order to achieve the advantageous effects of the blade geometry presented above, the phase shift between the high points 14a', 14b' of the bottoms of the adjacent blade grooves 14a, 14b may vary between 120 and 240 degrees, more preferably between 150 and 210 degrees.

In FIGS. 3, 4, 5, 6 and 7, reference sign Y is used to determine the maximum vertical distance between the top surface S of the blade bar 13 and the low point 14a", 14b" of the bottom of the blade grooves 14a, 14b. In other words, Y is a parameter determining the maximum depth of the profile of the bottom of the blade groove 14a, 14b, i.e. the maximum depth of the variable profile of the bottom of the blade groove 14a, 14b. The parameter Y determines how deep in the blade element body 12 the profile of the bottom of the blade groove is arranged to extend in the thickness direction of the blade element. In the embodiment of FIGS. 2 and 3, the parameter Y has such a high value that the profiles of the bottoms of the blade grooves 14a, 14b are arranged to pierce through the blade element body 12, whereby the blade element 11 comprises openings 15 extending through the blade element body 12. The openings 15 arranged through the blade element 11 may provide either feed openings for feeding material to be refined into the blade gap 6 of the refiner 10 or discharge openings for discharging material already refined away from the blade gap 6. In the embodiments of FIGS. 4 and 5, and later in FIGS. 6 and 7, the parameter Y has such a low value that the profile of the bottom surface of the blade groove is not arranged to pierce through the blade element body 12.

Generally, the parameter X1 determines the cycle length of one cycle or one complete portion of the variable profile of the bottom of the blade groove comprising alternating high points and low points, the parameter X2 determines the phase shift between the variable profiles of the bottoms of the adjacent blade grooves, and the parameter Y denotes the maximum depth of the variable profile of the bottom of the blade groove. The parameters X1, X2 and Y are geometrical parameters of the blade groove geometry. The parameter Y may thus be used to determine, whether the profile of the bottom surface of the blade groove is arranged to pierce or not to pierce through the blade element body 12. The parameter X1 determines the vertical component of the variable profile of the bottom of the blade groove and the number of openings through the blade element body, if the profile of the bottom of the blade groove is arranged to pierce through the blade element body 12.

The geometrical parameters X1, X2, Y of the blade grooves may be constant over the entire refining surface of the blade element, i.e. over the entire length of the blade groove. The parameters X1, X2, Y may also vary continuously in the longitudinal direction LD of the blade grooves, or the parameters X1, X2, Y may be different in different zones of the refining surface, i.e., in different portions of the blade element in the direction from the inner circumference 11a towards the outer circumference 11b, as exemplified in FIGS. 6 and 7. In the embodiment of FIG. 6, the parameter X1 is arranged to decrease in the direction from the inner circumference 11a towards the outer circumference 11b, i.e., the wavelength of the blade groove bottom profile is arranged to decrease towards the outer circumference 11b, and in the embodiment of FIG. 7 the parameter Y is arranged to decrease in the direction from the inner circumference 11a towards the outer circumference 11b, i.e., the maximum depth of the blade groove is arranged to decrease towards the outer circumference 11b.

In the embodiments disclosed above, the bottom of the blade groove comprising the variable profile extends over the entire length of the blade grooves, but it is also possible that the variable profile of the bottom of the blade groove is arranged to only extend over a portion of the length of the blade groove.

Referring back to the embodiment of the blade element 11 shown in FIGS. 2a and 2b and considering the mutual construction of the adjacent blade bars 13a, 13b, blade bar angles α13a, α13b of the adjacent blade bars 13a, 13b are arranged to vary continuously in the longitudinal direction LD of the blade bars 13a, 13b in such a way that, at the same predetermined position in the longitudinal direction LD of the blade bars 13a, 13b, the absolute magnitudes of the blade bar angles α13a, α13b are equal but the directions of the phase angles are opposite. In the embodiment of the blade element 11 shown in FIGS. 2a and 2b this means that at the same distance from the inner circumference 11a of the blade element 11 the absolute magnitudes of the blade bar angles α13a, α13b are equal but the directions of the phase angles are opposite.

The blade bar angle of each blade bar 13 thus varies continuously in its longitudinal direction LD so that each blade bar 13 extends in a wavelike manner or as a smooth zigzag, i.e. provides a wavy pattern in the plane P of the refining surface 11'. With two adjacent blade bars 13a, 13b, there is a phase shift in their zigzag-waves so that the distance between the two adjacent blade bars 13a, 13b (i.e., the width of the blade groove 14) widens and narrows periodically. According to the embodiment of FIGS. 2a and 2b, the phase shift between two neighbouring blade bars is 180 degrees. Further, when considering the wavy pattern of three adjacent blade bars 13a, 13b, 13c, it is seen that when the distance of the middle bar 13b and its left-side neighbour bar 13a is at the minimum, the distance to its right-side neighbour bar 13c is at the maximum. The wavelength of the smooth zigzag pattern of the blade bars 13 may remain constant from the inner edge 11a up to the outer edge 11b, but it may also change, being, for example, less dense or longer in the vicinity of the inner edge 11a and more dense or shorter closer to the outer edge 11b.

In disc refiners, the blade bar angle is defined as an angle between an edge of the blade bar and the direction of the radius of the refining element, whereas in conical and cylindrical refiners the blade bar angle is defined as an angle between an edge of the blade bar and a projection of the shaft of the refiner on the refining surface of the refining element. In FIG. 2, the lines DR indicate the direction of the radius of the blade element 11. In rotating refining elements the blade bar angle is typically defined in relation to the front edge of the blade bar, i.e., the edge of the blade bar directed towards the rotation direction R of the rotating refining element, the embodiment of FIGS. 2a and 2b disclosing a blade element intended for the rotating refining element, as can be seen from the blade bar angles α13a, α13b shown in FIGS. 2a and 2b. In stationary refining elements, in turn, the blade bar angle is typically defined in relation to the back edge, i.e. the rear edge, of the blade bar, which is the edge of the blade bar directed towards the direction, opposite to the rotation direction R of the rotating refining element.

Generally, the varying geometry of the blade bars 13 in their longitudinal direction also diminishes the vulnerability of the blade bars 13 against impacts caused by foreign objects that have entered into the blade gap of the refiner and hit the blade bar, which increases the effective service life of the blade element.

The varying geometry of the adjacent blade bars 13a, 13b in their longitudinal direction as disclosed above also causes that the width of the blade groove 14 between the adjacent blade bars 13a, 13b varies continuously in the longitudinal direction of the blade groove 14, when the width W of the top surface S of the blade bars 13 is maintained constant. In the embodiment of the blade element of FIGS. 2a and 2b, the width of the blade groove 14 is arranged to vary in such a way that at or close to the high point 14a', 14b' of the blade groove bottom profile the width of the blade groove is arranged to be at its minimum, whereby the material to be refined is more efficiently forced away from the blade groove 14 towards the blade gap 6 at that high point 14a', 14b' of the blade groove bottom profile and in its vicinity. Respectively, the width of the blade groove is arranged to be at its maximum at or close to the low point 14a", 14b" of the blade groove bottom profile. This increases the capacity of the blade groove to receive the material to be refined and the material already refined, which prevents the blade groove from becoming clogged. This advantageous effect will even be emphasized in those blade elements, where the blade groove bottom profile is arranged to pierce the blade element body at the low point of the blade groove bottom profile, whereby the blade element comprises, at the bottom of the blade grooves, openings for feeding the material to be refined into the blade gap or for discharging the material already refined away from the blade gap. In other words, in the embodiment disclosed above the phase shift in the geometries of the neighboring blade groove bottom profiles in the thickness direction of the blade element and the phase shift in the geometries of the neighboring blade bars in the plane of the refining surface of the blade element are mutually synchronized so as to provide the refining surface geometry as disclosed in FIGS. 2a and 2b.

The varying geometry of the adjacent blade bars 13a, 13b also causes, that intersecting angles of the blade bars in the opposing refining elements also vary, which increases the flow of material to be refined to the blade gap 6 between the opposing refining elements 1, 2.

The blade element of FIGS. 2a and 2b thus comprises a simultaneous change in the phase of the waveforms of the blade groove bottoms, i.e., in the thickness direction of the blade element, and in the phase of the waveforms of the blade bars, i.e., in the plane P of the refining surface of the blade element. Furthermore, the change in the phase of the blade groove bottom profile and the change in the phase angle of the blade bar angle (α13a, α13b) may also be mutually synchronized. This means, for example, when considering the embodiment of FIG. 6, where the wavelength of the blade groove bottom profile is arranged to decrease towards the outer circumference 11b of the blade element 11, that also the wavelength of the waveform of the blade bar in the plane of the refining surface decreases correspondingly, i.e., in phase with the change in the wavelength of the blade groove profile bottom.

In addition to the embodiment disclosed in FIGS. 2a and 2b, it should also be noted that embodiments of blade elements that only comprise a variable profile bottom of the blade grooves as disclosed above but do not comprise a varying blade bar angle as disclosed above are also blade elements according to the presented solution. According to an embodiment of the blade element, the blade bars may thus also be straight or smoothly curved in one direction.

The blade element 11 may be manufactured by first manufacturing a blade element billet comprising a blade element body 12 and protrusions and recesses therebetween for providing blade bar billets and blade groove billets. Thereafter, the blade groove billets are machined, by for example cutting and/or grinding so as to form blade grooves 14, 14a, 14b, wherein the bottom of the blade grooves 14, 14a, 14b have, in the longitudinal direction LD of the blade grooves 14a, 14b, a variable profile comprising alternating high points 14a', 14b' and low points 14a", 14b" in such a way that there is a phase shift X2 between the high points 14a', 14W and the low points 14a", 14b—" of the variable profile bottoms of the adjacent blade grooves 14a, 14b.

Simultaneously, when the blade groove billets are machined to form blade grooves 14, 14a, 14b as described above, the same tool may be used to machine the blade bar billets to form blade bars 13, 13a, 13b. The blade bar billets are machined in such a way that the blade bar angle of the blade bars is arranged to vary in the longitudinal direction LD of the blade bars 13, 13a, 13b as disclosed above. The blade element billet may be manufactured by casting, whereby the blade element body 12 and the blade bars 13 together provide a blade element billet having originally a uniform structure. Alternatively, in order to provide a blade element billet, blade bar billets for providing the blade bars 13 could be attached to a piece forming the blade element body 12 by welding, for example. In both cases the complete final blade element 11 is provided by machining the blade element billet thereafter. In machining the blade bar billets and the blade groove billets, three-axis machining may be used to simultaneously provide the finished blade bars and blade grooves.

The same manufacturing method may also be used in embodiments, where a single blade element is intended to provide the complete refining surface of the refining element.

It will be obvious to a person skilled in the art that, as the technology advances, the inventive concept can be implemented in various ways. The invention and its embodiments are not limited to the examples described above but may vary within the scope of the claims.

We claim:

1. A blade element for a refiner for refining fibrous material, the blade element comprising:
   a blade element body having a refining surface;
   a plurality of blade bars and blade grooves therebetween, the blade bars and the blade grooves forming the refining surface of the blade element body;
   wherein adjacent blade grooves are two of said blade grooves which have only a single one of said blade bars therebetween;

wherein adjacent blade bars are two of said blade bars which have only a single one of said blade grooves therebetween;

wherein the blade grooves extend in a longitudinal direction along the refining surface, and wherein the blade grooves have bottoms which extend along the blade grooves in the longitudinal direction;

wherein each blade groove bottom has a variable depth profile as it extends along its associated groove in the longitudinal direction, said profile having alternating high points and low points;

wherein there is a phase shift between the high points and the low points of the variable depth profile of the groove bottoms of adjacent blade grooves;

wherein a blade bar angle of each blade bar is arranged to vary continuously in the longitudinal direction of each blade bar so that the blade bar extends in a wave shaped manner in a plane of the refining surface and that there is a phase shift between two adjacent blade bars.

2. The blade element of claim 1 wherein the magnitude of the phase shift between the high points and the low points of the variable depth profile of the groove bottoms of adjacent blade grooves is between 120 and 240 degrees.

3. The blade element of claim 2 wherein the magnitude of the phase shift between the high points and the low points of the variable depth profile of the groove bottoms of adjacent blade grooves is between 150 and 210 degrees.

4. The blade element of claim 3 wherein the magnitude of the phase shift between the high points and the low points of the variable depth profile of the groove bottoms of adjacent blade grooves is 180 degrees.

5. The blade element of claim 1 wherein at least at one low point in at least one blade groove profile of the bottom of a blade groove, said at least one blade groove profile extends through the blade element body so that the blade element has portions defining at least one opening extending through the blade element body in the at least one blade groove.

6. The blade element of claim 1 wherein the variable depth profiles of the bottoms of the blade grooves have a continuous periodic waveform.

7. The blade element of claim 6 wherein the continuous periodic waveforms define a wavelength, which varies in the longitudinal direction of the blade grooves.

8. The blade element of claim 1 wherein a change in a phase of the blade groove bottom profile and the change in the phase of the angle of the blade bars are mutually synchronized.

9. The blade element of claim 1 wherein the blade element is a blade segment which provides a part of a complete refining surface of a refining element of a refiner.

* * * * *